UNITED STATES PATENT OFFICE.

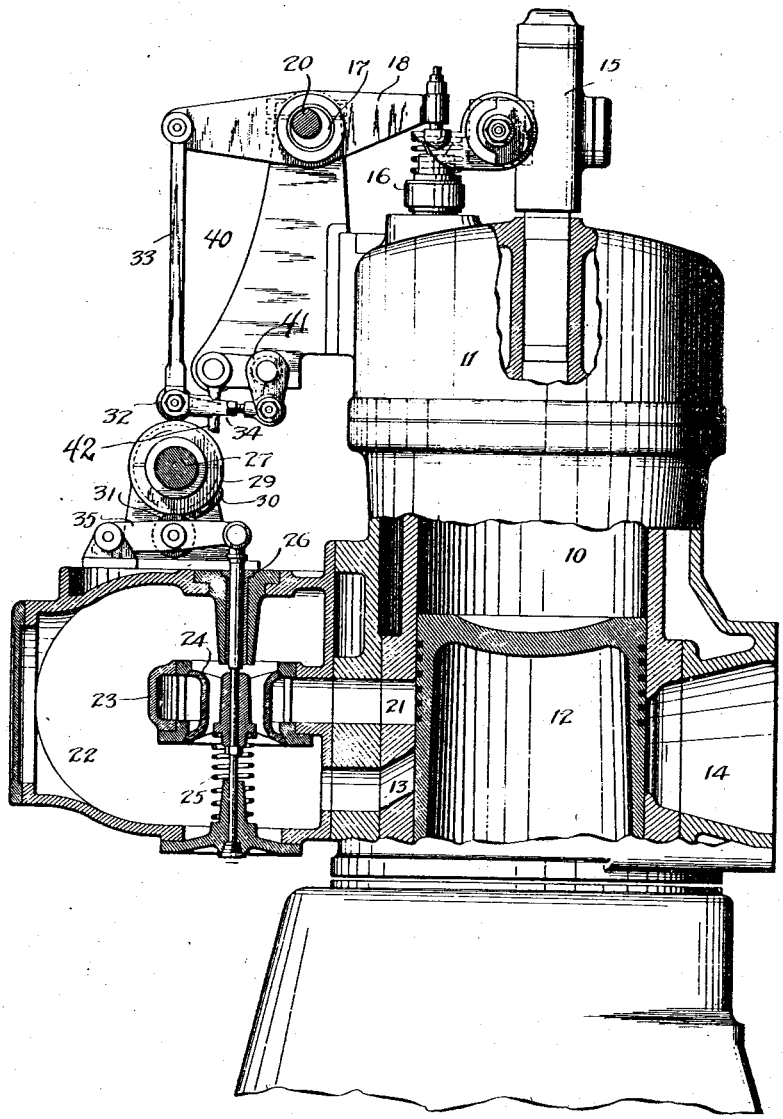

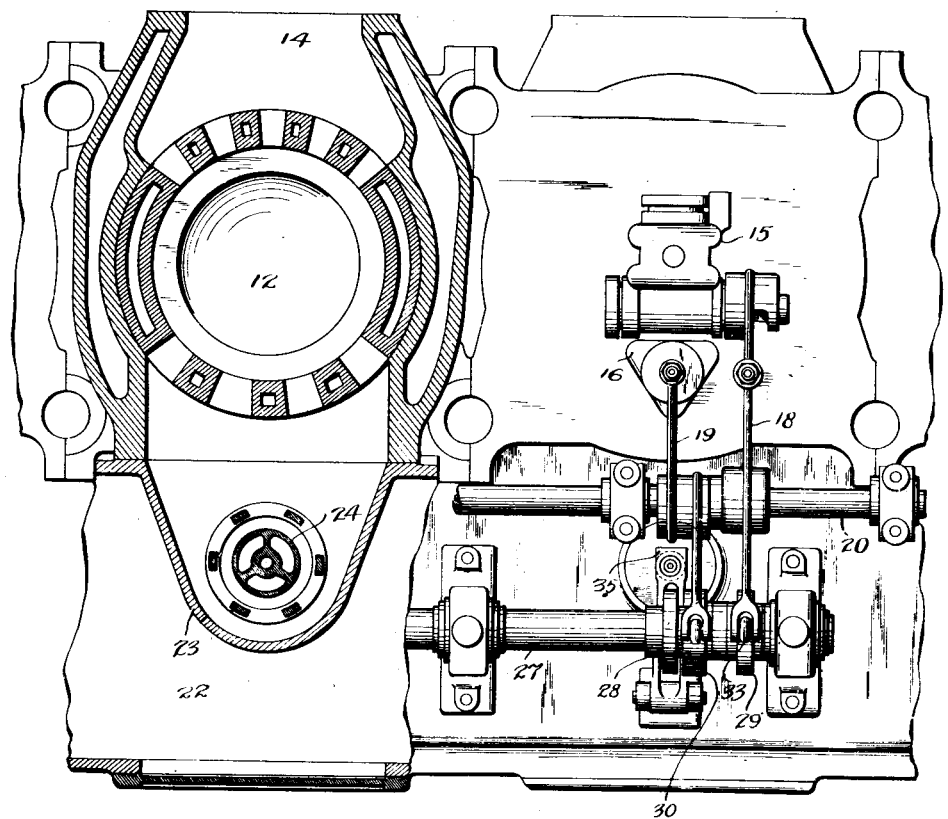

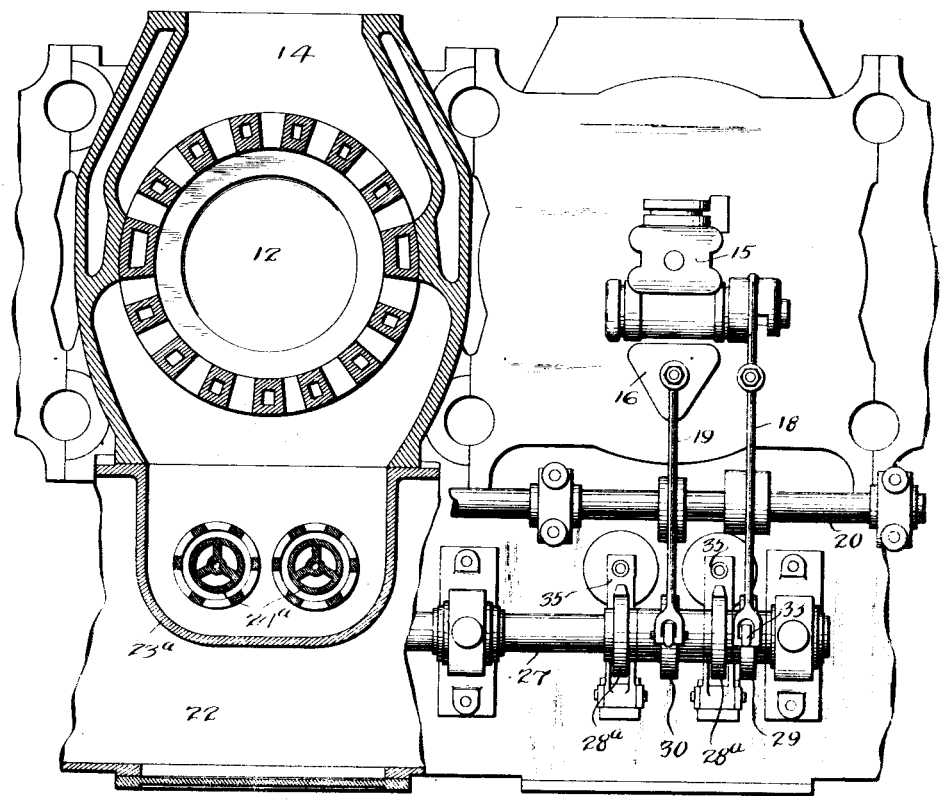

THEODOR REUTER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

INTERNAL-COMBUSTION ENGINE.

1,168,331.      Specification of Letters Patent.      Patented Jan. 18, 1916.

Application filed July 12, 1913. Serial No. 778,646.

*To all whom it may concern:*

Be it known that I, THEODOR REUTER, a citizen of the Republic of Switzerland, residing at Winterthur, Canton of Zurich, Switzerland, have invented the following described new and useful Improvements in Internal-Combustion Engines.

This invention has reference to internal combustion engines in which the fuel oil is injected into a body of air previously compressed in the cylinder by the piston on its inward or compression stroke; and it constitutes an improvement in relation to those engines wherein a supplementary supply of air is forced into the cylinder, before the admission of the fuel, in order to give added power or to compensate for increased load.

Specifically the invention consists in an improved combination and arrangement of the component parts of a two-cycle engine operating on this principle, the object being to provide a compact and reliable construction, which may permit a common valve-operating shaft acting, through simple and direct connections, to operate both the upper and the lower valves, that is to say the fuel and starting valves in the head portions of the cylinders and the air valves near the lower or outer ends thereof, and in addition thereto secures other important advantages, as will be apparent to those skilled in this art.

The invention likewise involves features of structure and operation, independent of the supplemental air supply above mentioned and as will be evident to those skilled in the art from the description which follows.

In the drawings illustrating two of the numerous possible embodiments of the invention: Figure 1 is an elevation, partially in section; Fig. 2 is a plan view, partly in section, of the parts in Fig. 1; and Fig. 3 is a similar view of the second illustrated construction.

The drawing represents a two-cycle Diesel engine, to which type the invention is especially applicable, the said engine having a cylinder 10 with a head 11, a piston 12, piston-controlled scavenging and exhaust ports 13 and 14 in the side of the cylinder near its outer or lower end, and fuel and starting valves 15 and 16 in the head, all of which may be as usual. As is well understood, the fuel valve of a Diesel engine is designed to inject the oil in atomized form into a body of air compressed in the cylinder, utilizing for this purpose a supply of air at higher pressure than the compression in the cylinder; and accordingly the valve is connected with suitable sources of oil and air under pressure (not shown) and is adapted to be opened and closed at the proper times. The starting valve, as is also well understood, admits air for operating the engine as a compressed air motor when starting or on special occasions. Either of these valves may be caused to open more or less or not at all, according to the extent to which the eccentric pivots 17 of the actuating levers 18, 19 are turned about the axis of their supporting shaft 20. This shaft is mounted on a cylinder carried bracket 40.

The scavenging and exhaust ports 13 and 14 are arranged so as to be open simultaneously when the piston is about at the end of its outward stroke, the exhaust port extending somewhat higher than the scavenging port, so that the pressure of the burned charge in the cylinder has a chance to fall before the scavenging ports are uncovered. In addition to the scavenging ports and at the same side of the cylinder and somewhat above the scavenging ports are supplementary air ports 21, the number and aggregate area of these ports depending upon conditions.

An air conduit or scavenging manifold 22 is disposed at and preferably built against this side of the cylinder, adjacent its outer or lower end; and as shown in Figs. 2 and 3 illustrating a plurality of cylinders, it extends lengthwise of the engine, having communication with the several cylinders. Both the scavenging ports 13 and the supplementary air ports 21 lead from the air line through the side wall of the cylinder, but whereas the former lead directly from the interior of the air line, the latter open from a valve chamber 23 therein, of which there is one for each cylinder. In this chamber is a valve 24, here shown as a vertically movable double seat valve, which when depressed establishes communication between the air line and the cylinder by way of the port or ports 21. A spring 25 serves to seat this valve, and the means for unseating it include a stem 26, which passes through the top wall of the air passage.

A cam shaft 27, driven in any convenient manner from the engine shaft, constitutes a common operating means for both the upper and lower valves and is disposed in intermediate relation thereto. Thus, it is found extending lengthwise of the engine, at the same side of the cylinders as the air conduit 22 and the valves 24. It is above the air conduit, and as shown may be comparatively close thereto. It carries cams 28, 29, 30, of which the high part of the first engages at the proper time with a roll 31 connected with the supplementary air valve 24, while the second engages, also at the proper time, with a roll 32 connected to the fuel valve. The cam 30 may or may not be intercepted sufficiently by the similar roll connected to the starting valve 16, to produce opening of this valve, according to the position of the corresponding shiftable fulcrum 17, as already explained. The actuating linkage for the fuel and starting valves are substantial duplicates, so that detailed illustration of both is unnecessary. As shown, the two-armed rocker 18 or 19, as the case may be, is pivoted at its outer end to a depending link 33, which is pivotally connected at its lower end to a swinging guide arm 34, the roll 32 being mounted at the point of pivotal connection, and in position to be engaged by its appropriate cam. The other end of the arm 34 is pivoted to a bell crank 41, which can be operated by a rod 42, to shift the location of the roller 32 with relation to its cam so as to vary the time and extent of operation of the fuel valve. Such rod is ordinarily connected up with other parts under the control of a suitable main controlling gear whereby the speed and direction of operation of the engine may be governed. The bell crank 41 is supported on the lower part of the bracket 40, so that the said control lever 42 may be adjacent to the cam shaft and hence more direct and reliable in its movement of the roller 32. The roll 31 of the valve 24 is mounted on a lever 35 of the third order, which is fulcrumed at one end on top of the air conduit and the other end is connected with the upper end of the valve stem 26, thus multiplying the movement to unseat this valve.

From the foregoing it will be perceived that the parts are so relatively arranged that the intermediately disposed cam shaft actuates both the upper and lower valves through direct, oppositely-extending connections.

In operation, the piston toward the end of its outward stroke first uncovers the supplementary air ports 21, but these are still kept closed by the valve 24, thus preventing premature admission of air. The exhaust port is next uncovered and by the time the pressure in the cylinder is sufficiently vented, the piston uncovers the scavenging port or ports 13, thus admitting air under pressure to drive out the remaining gases and to fill the cylinder with air for compression by the piston on the return stroke. The cam 27 is so set as to bring about the opening of the valve 24 simultaneously with the uncovering of the scavenging ports 13 or slightly thereafter. Accordingly, the scavenging may be performed by air entering through both sets of ports 21 and 13; but on the return or inward stroke the piston closes the ports 13 and then the exhaust port 14, after which the supplementary air ports remain open for a brief time, or for as long as may be necessary, according to the proportioning of the ports, so that a supplementary charge of air,—additional to the scavenging air,—is forced into the cylinder during the early part of the compression stroke, and before the introduction of the fuel. After the piston has closed these supplementary air ports the cam 27 also permits the valve 24 to be closed. At or about the end of the compression stroke,—that is to say, at or about dead center,—the cam 27 opens the fuel valve and the fuel is atomized and injected into the body of compressed air in the cylinder, which consists of the scavenging air and the supplementary air. The mingled air and fuel are then permitted to burn and expand against the piston, thereby driving the latter on the outward stroke. In a Diesel engine the ignition takes place on contact of the fuel with the highly compressed and therefore extremely hot body of air in the cylinder.

The construction shown in Fig. 3 is similar to that of Figs. 1 and 2, but illustrates the fact that a plurality of valves 24ª may be used with advantage for controlling the admission of supplementary air to each cylinder. These valves may be disposed in a common valve chamber 23ª. The use of two or more smaller valves, instead of one larger valve, is particularly desirable in larger motors, since it enables the valves to be brought closer to the cylinder wall and the ports 21 to be made smaller, and in general makes for compactness and economy of space. The best advantage is realized when the valves are disposed symmetrically with respect to a center line through the cylinder, as shown. The valves are simultaneously actuated by cams 28ª on the cam shaft, in the same manner as the single valve 24 of the other construction; and one or both of the fuel and starting cams 29, 30, may be keyed on the shaft between the air admission cams. As shown, the starting cam 30 is located between the two air admission cams.

What I claim as new is:

1. An internal combustion engine comprising a cylinder having lateral piston-controlled scavenging and supplementary air admission ports, a valve also controlling the supplementary air admission port, fuel and starting valves in the head, and a common operating device arranged between the upper and lower valves for direct operation of both.

2. An internal combustion engine having a cylinder, piston and fuel valve whereby the fuel is injected in atomized form into air previously compressed in the cylinder, and also provided with means including a valve for admitting supplementary air during the compression stroke, in combination with a common operating device disposed at the side of the cylinder intermediate the fuel valve and the supplementary air valve and having direct operating connections with both.

3. In an internal combustion engine, the combination with a cylinder, piston and fuel valve for injecting the fuel into a body of air compressed in the cylinder by the piston, of a lateral air admission port, a valve controlling the same, a common cam shaft disposed in intermediate relation to said fuel and air valves, and oppositely extending operating connections between said cam shaft and valves.

4. In an internal combustion engine, the combination with a cylinder, a piston therein, an exhaust, means for supplying compressed air to the cylinder for scavenging and subsequent compression by the piston, and a fuel valve for admitting the fuel to the body of air thus compressed, of a valve at the side and lower part of the cylinder for controlling the admission of supplementary air before the admission of the fuel, a common cam shaft disposed at one side of the cylinder above said air valve, and operating connections from the cam shaft to the fuel valve on the one hand and to the supplementary air valve on the other hand.

5. In an internal combustion engine, the combination with a cylinder, a piston therein, a fuel valve, and piston-controlled scavenging and exhaust ports organized so that the engine operates on a two-stroke cycle, the fuel being introduced into a body of air previously compressed by the piston on the inward stroke, of means for forcing supplementary air into the cylinder during the inward stroke comprising a piston-controlled port above the scavenging port and a valve also controlling said supplementary air port, a cam shaft at the same side of the cylinder as the supplementary air valve, and operating connections extending upward from the cam shaft to actuate the fuel valve and downward to actuate the supplementary air valve.

6. An internal combustion engine having a cylinder, piston controlled exhaust and scavenging means, and means comprising a valve for injecting the fuel into a body of air previously compressed by the piston, the cylinder being provided further with a lateral piston controlled port through which additional air is forced into the cylinder and a valve also controlling the admission through said port, in combination with a common cam shaft and cams thereon in intermediate relation to said fuel and air valves, and suitable linkage connected to said valves and arranged to be engaged by said cams.

7. An internal combustion engine having a cylinder, a piston, a fuel valve for injecting the fuel into a body of air previously compressed in the cylinder by the piston on the inward stroke, an air conduit at one side of the cylinder, a valve therein controlling communication with the cylinder, a common cam shaft over said air conduit, and connections extending upward to actuate the fuel valve and downward through the top of the conduit to actuate the valve therein.

8. An internal combustion engine having parallel cylinders and pistons, fuel valves for injecting the fuel into air previously compressed in the cylinders by the pistons, an air conduit at one side of the cylinders, separate scavenging and supplementary air ports opening through the side of the cylinders from said conduit, valves controlling the supplementary air port or ports, and a cam shaft at the same side of the cylinders as said air conduit and above the latter, and having connections on the one hand with the fuel valves and on the other hand with the supplementary air valves.

9. In an internal combustion engine, the combination of a cylinder and cylinder head, a fuel valve in the latter, an air conduit at one side of the cylinder adapted to communicate with the interior thereof by lateral ports, a valve chamber in said conduit adapted to communicate on the one hand with the interior of the conduit and on the other hand with part of said ports, a valve vertically movable toward and from its seat in said chamber and having a stem extending through the top of the conduit, a cam shaft and cams thereon over the conduit, a lever of the third order connected to said stem and arranged to be depressed by a cam on the cam shaft, a two armed rocker lever for engagement with said fuel valve, and a link depending from said rocker lever and adapted to be elevated by a cam on the cam shaft.

10. In an internal combustion engine, the combination of a cylinder and cylinder head, a fuel valve in the latter, a conduit at one side of the cylinder adapted to communicate with the interior thereof by lateral ports, a valve chamber in said conduit adapted to communicate on the one hand with the interior of the conduit and on the other hand with part of said ports, a valve vertically movable toward and from its seat in said chamber and having a stem extending through the top of the conduit, a cam shaft at the same side of the cylinder as the conduit adapted to depress said stem, and connections extending upward from the cam shaft to actuate the fuel valve.

11. In an internal combustion engine, a cylinder and piston, a fuel valve for injecting the fuel into a body of air compressed in the cylinder by the piston, scavenging and exhaust means operative near the end of the outward stroke, and a valve at the side and lower part of the cylinder for controlling the admission of a supplementary charge of compressed air which is forced into the cylinder previous to the admission of fuel, in combination with a common cam shaft in intermediate relation to the fuel and supplementary air valves, and connections to said valves actuated by said shaft in approximately opposed relation.

12. An internal combustion engine having a cylinder, a piston therein, valve mechanism for injecting atomized fuel into air previously compressed by the piston on its inward stroke, a source of compressed air and valve mechanism whereby air is forced into the cylinder during said inward stroke, and a common shaft arranged to actuate both valve mechanisms.

13. In an internal-combustion engine, the combination with a cylinder, a piston therein, fuel valve mechanism for injecting fuel into air compressed by the piston on its inward stroke, an exhaust which is opened at or near the end of the outward stroke of the piston, and means for supplying scavenging air under pressure at such time, of valve mechanism controlling the admission of a supplementary charge of air during the inward or compression stroke, and a common cam shaft in direct operative relation to both said valve mechanisms.

14. A combustion engine comprising parallel cylinders having lateral air valves near their outer ends, and fuel valves at their opposite ends, a shaft extending transversely to the several cylinders and common to all of them, and means whereby said shaft actuates both valves of each cylinder.

15. A combustion engine comprising parallel cylinders with lateral ports and valves near their outer ends and fuel injecting valves in their heads, a horizontal shaft extending transversely to the cylinders below the heads thereof, and means on said shaft whereby it operates both sets of valves.

16. A combustion engine comprising an upright cylinder and piston, a fuel injecting valve in the head part of the cylinder, a valve controlled port in the opposite end thereof, and a shaft for operating both valves disposed below the fuel valve, in combination with a control lever adjacent to the valve shaft and adapted to vary the operation thereof upon the fuel valve.

In testimony whereof, I have signed this specification in the presence of two witnesses.

THEODOR REUTER.

Witnesses:
CARL GUBLER,
AUGUST RUEGG.